United States Patent [19]

Hensley, Jr.

[11] 3,849,296

[45] Nov. 19, 1974

[54] CATALYST COMPRISING ZINC OXIDE, SILICA AND ALUMINA AND PROCESSES EMPLOYING SAME

[75] Inventor: Albert L. Hensley, Jr., Munster, Ind.

[73] Assignee: Standard Oil Company, Chicago, Ill.

[22] Filed: June 14, 1972

[21] Appl. No.: 262,572

[52] U.S. Cl. .................. 208/216, 208/111
[51] Int. Cl. .......................... C10g 23/02
[58] Field of Search ............. 208/216, 111, 136

[56] References Cited
UNITED STATES PATENTS

| | | | |
|---|---|---|---|
| 2,508,014 | 5/1950 | Davidson | 208/136 |
| 2,773,810 | 12/1956 | Kimberlin et al. | 208/136 |
| 2,906,713 | 9/1959 | Hunter et al. | 208/136 |
| 2,967,820 | 1/1961 | Johnson et al. | 208/216 |
| 3,531,398 | 9/1970 | Adams et al. | 208/216 |
| 3,627,674 | 12/1971 | Nagl | 208/216 |
| 3,649,525 | 3/1972 | Hilfman | 208/216 |

Primary Examiner—Delbert E. Gantz
Assistant Examiner—C. E. Spresser
Attorney, Agent, or Firm—James L. Wilson; Arthur G. Gilkes; William T. McClain

[57] ABSTRACT

The catalyst comprises a hydrogenation component on a support comprising a composite of zinc oxide, silica, and a catalytically active alumina. The catalytic support may contain from about 2 weight percent to about 10 weight percent silica and a maximum amount of 50 weight percent zinc oxide. A preferred hydrogenation component comprises cobalt and molybdenum, their oxides, and/or their sulfides.

The processes employing the catalyst include a process for the hydroprocessing of a hydrocarbon feedstock and a process for the hydrodesulfurization of a hydrocarbon feedstock. The processes are suitable for processing heavy hydrocarbon feedstocks, such as petroleum hydrocarbon residua.

16 Claims, 1 Drawing Figure

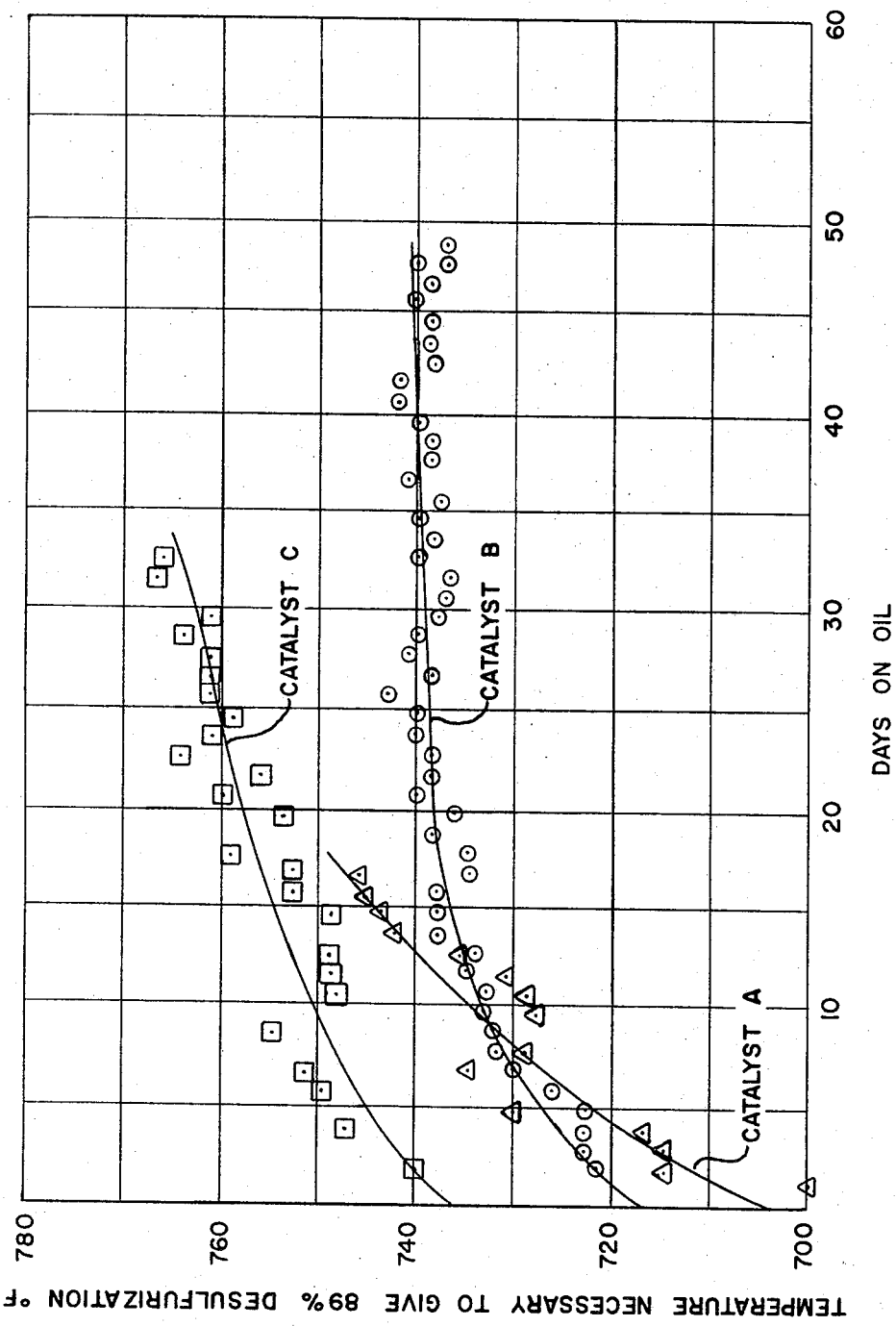

//3,849,296

CATALYST COMPRISING ZINC OXIDE, SILICA AND ALUMINA AND PROCESSES EMPLOYING SAME

BACKGROUND OF THE INVENTION

Suitable catalysts have been devised for the hydroprocessing of mineral oils, and the like. As considered herein, the term "hydroprocessing" comprehends the contacting of a hydrocarbon feedstock with a catalyst in the presence of hydrogen and under selected conditions to remove hetero-atoms, such as sulfur, nitrogen, and oxygen, from said feedstock and/or to saturate aromatic hydrocarbons and olefinic hydrocarbons in said feedstock. These catalysts generally contain a hydrogenation component and a suitable catalytic support. The catalytic support may be a neutral or a weakly acidic support material, such as charcoal or a catalytically active alumina. On the other hand, the catalytic support may be a strongly acidic material, such as a silica-alumina cracking catalyst or an acid-treated alumina. These catalytic compositions have been used to treat light petroleum distillates, as well as those hydrocarbon streams which contain petroleum hydrocarbon residua.

A new and novel catalytic composition has now been discovered, which catalytic composition is an improved catalyst for hydroprocessing hydrocarbon materials. This catalytic composition is particularly suitable for the desulfurization of residual type hydrocarbon stocks and other heavy fuels, such as shale oil, liquified coal, and oil from tar sands. This catalytic composition may be employed in a process to treat a mineral oil wherein there is a chemical alteration of at least some of the molecules of the mineral oil being treated to remove sulfur and nitrogen therefrom and to form mineral oils which have properties that are different than those of the original mineral oil.

SUMMARY OF THE INVENTION

Broadly, in accordance with the invention, there is provided a catalytic composition which comprises a hydrogenation component on a solid catalytic support comprising a composite of zinc oxide, silica, and a catalytically active alumina. The catalytic support comprises a maximum amount of 50 weight percent zinc oxide and an amount of silica ranging from about 2 weight percent to about 10 weight percent, based on the weight of said catalytic support. The hydrogenation component comprises one or more members selected from the group consisting of metals of Group VA of the Periodic Table of Elements, metals of Group VIA of the Periodic Table of Elements, metals of Group VIII of the Periodic Table of Elements, the oxides of said metals, the sulfides of said metals, and combinations thereof. A preferred hydrogenation component comprises molybdenum, a Group VIA metal, and cobalt, a Group VIII metal.

According to the invention, there is provided a process for the hydroprocessing of a hydrocarbon feedstock. This process comprises contacting in a reaction zone said feedstock with the catalytic composition described hereinabove in the presence of hydrogen and under hydroprocessing conditions. Moreover, there is provided a process for the hydrodesulfurization of a hydrocarbon feedstock, which process comprises contacting in a reaction zone said feedstock with the catalytic composition described hereinabove in the presence of hydrogen and under hydrodesulfurization conditions. There is also provided a process for the hydrodesulfurization of a hydrocarbon feedstock selected from the group consisting of petroleum hydrocarbon residua, shale oil, liquified coal, oil from tar sands, and combinations thereof, which process comprises contacting in a reaction zone said feedstock with the catalytic composition described hereinabove in the presence of hydrogen and under hydrodesulfurization conditions.

BRIEF DESCRIPTION OF THE DRAWING

The accompanying drawing provides a comparison of the performance of three catalysts for the hydrodesulfurization of a Khafji high-sulfur atmospheric resid. One of the catalysts is an embodiment of the catalytic composition of the present invention.

DESCRIPTION AND PREFERRED EMBODIMENTS

According to the invention, there is provided a new, novel, and improved catalytic composition. This catalytic composition comprises a hydrogenation component on a solid catalytic support comprising a composite of zinc oxide, silica, and catalytically active alumina. The catalytic support comprises a maximum amount of about 50 weight percent zinc oxide, based on the weight of the catalytic support. Furthermore, the catalytic support comprises from about 2 weight percent to about 10 weight percent silica, based on the weight of the catalytic support. Advantageously, the amount of zinc oxide is in excess of 5 weight percent, based on the weight of the catalytic composition.

It is contemplated that the hydrogenation component of the catalytic composition of the present invention may comprise one or more metals selected from Group VA of the Periodic Table of Elements, Group VIA of the Periodic Table of Elements, and Group VIII of the Periodic Table of Elements. Each of these metals may be present in the elemental form, as the oxide, as the sulfide, or as a combination thereof. Typical examples of such metals are vanadium from Group VA, molybdenum and tungsten from Group VIA, and cobalt and nickel from Group VIII. The Periodic Table of Elements considered herein is found in Kirk-Othmer, *ENCYCLOPEDIA OF CHEMICAL TECHNOLOGY*, 2nd ed., Vol. 8, Interscience Publishers, a division of John Wiley & Sons, Inc., New York, page 94.

Preferably, the hydrogenation component comprises a member selected from the group consisting of a metal of Group VIA of the Periodic Table of Elements and a metal of Group VIII of the Periodic Table, the oxides of said metals, the sulfides of said metals, and combinations thereof. A preferred metal of Group VIA is molybdenum, while a preferred metal of Group VIII is cobalt. Molybdenum may be present in an amount of about 2 weight percent to about 20 weight percent, calculated as $MoO_3$ and based on the weight of the catalytic composition. Cobalt may be present in an amount of about 0.5 weight percent to about 5.0 weight percent, calculated as $CoO$ and based on the weight of the catalytic composition.

The solid catalytic support comprises a composite of zinc oxide, silica, and a catalytically active alumina. Suitably, this composite may be prepared by combining an aqueous solution of a soluble zinc compound, such as zinc acetate, zinc sulfate, or zinc chloride, and a member selected from the group consisting of a suspension of an organic silicate in water and an aqueous sodium silicate solution, with a sol or gel of a catalytically active alumina. If the source of silica is an aqueous sodium silicate solution, the catalytic support composite must be washed and cation-exchanged with a solution of an ammonium salt, such as ammonium nitrate or ammonium carbonate, to remove the sodium therefrom. The resulting blend is subsequently dried and calcined. The hydrogenation metals may then be incorporated onto the dried support by any suitable means, such as impregnation.

A preferred method for preparing the solid catalytic support of the catalytic composition of the present invention is described hereinbelow. This preferred method of preparation comprises: (1) adding an aqueous solution of a soluble zinc salt and a member selected from the group consisting of a suspension of an organic silicate in water and an aqueous alkali silicate solution, such as an aqueous sodium silicate solution, to an alumina sol; (2) thoroughly blending said aqueous solution of soluble zinc salt, said member selected from the group consisting of a suspension of an organic silicate in water and an aqueous alkali silicate solution, and said alumina sol to obtain a thoroughly blended mixture; (3) gelling said thoroughly blended mixture by adding an aqueous solution of an alkali metal hydroxide or an aqueous solution of ammonium hydroxide to said thoroughly blended mixture to provide a pH of about 5.5 to about 10.0 and to obtain a gel; (4) filtering said gel to obtain a filtered material; (5) washing said filtered material with a member selected from the group consisting of water and an ammonium carbonate solution to remove mon-volatile soluble ions from the filtered material and to obtain a washed filtered material; (6) drying the washed filtered material to obtain a dried material; and (7) calcining the dried material in air at a temperature of at least 600°F. for a period of time of at least 0.5 hour. Typically, such calcination employs a temperature that does not exceed 1,200°F. Moreover, the period of time neccessary for the calcination may extend for 24 hours. The temperature employed will dictate the amount of time required for the calcination to achieve a properly calcined catalyst.

The sol of the catalytically active alumina that is employed in the preparation of the support of the catalytic composition of the present invention is a sol of gamma-alumina, eta-alumina, or mixtures of these allotropic forms. These definitions of alumina are definitions adopted as standard nomenclature by Russel, in his brochure entitled "Alumina Properties," Technical Paper No. 10, 1953, Aluminum Company of America, and by Stumpf, et al., IND. ENG. CHEM., 42, 1950, pages 1,398–1,403.

The sols of suitable aluminas can be purchased from manufacturers of catalysts. For example, the sols of HF-type aluminas are available from the Nalco Chemical Company. These HF-type aluminas can be obtained with pore volumes varying from as low as 0.54 cubic centimeters per gram to as high as 2.36 cubic centimeters per gram and with corresponding average pore diameters within the range of about 72 A to about 305 A. Such aluminas have surface areas varying from about 150 square meters per gram to about 500 square meters per gram, or more. In addition, sols of a suitable alumina can be obtained from the American Cyanamid Company, which alumina is a very pure alumina that is made from an electrolytic aluminum, which is sodium-free. Aluminas of this type may have average pore diameters in excess of 50 A and surface areas in excess of about 100 square meters per gram.

The catalytic support of the catalyst of the present invention may also be prepared by a co-precipitation method employing soluble salts, such as sodium aluminate, aluminum sulfate, aluminum nitrate, aluminum acetate, aluminum chloride, aluminum bromide, zinc nitrate, zinc acetate, zinc sulfate, zinc chloride, zinc bromide, ethyl ortho silicate, sodium silicate, and other soluble alkali silicates. For example, one might dissolve sodium aluminate in water, add the desired amount of silica as sodium silicate and thoroughly blend this composite with a second aqueous solution that contained the required amount of zinc nitrate and sufficient aluminum sulfate. The mixing of these two solutions would provide a solution having a pH within the range of about 5 to about 9. The co-precipitated material would then be aged at a temperature of 176°F. to 212°F. for a period of about 2 hours to about 30 hours, the length of time depending on the pH of the solution. The pore size of the final support is regulated by an appropriate adjustment of either the pH or the length of time employed, or both. The aged material would then be filtered and washed with an ammonium nitrate solution or an ammonium carbonate solution to remove at least 90 percent of the sodium ions and the sulfate ions. The composite would then be dried and calcined to provide the desired catalytic support.

The finished catalyst of the present invention may be prepared by employing the catalytic support, which is described hereinabove. The support may be suitably prepared according to the methods outlined hereinabove. The hydrogenation component may be incorporated into the catalytic composition by impregnating upon the solid catalytic support the selected hydrogenation-dehydrogenation metals. Such impregnation may be performed according to techniques that are well-known in the art and will not be described herein. As an alternate method, the hydrogenation component may be introduced into the catalytic composition by adding a solution of each of the metals comprising the hydrogenation component to a sol of the support, prior to the gelling of the sol. In this way, the hydrogenation component would be thoroughly and completely dispersed throughout the composite during the blending of the composite prior to the gelling step. Either one solution containing all of the soluble salts of the metals or a solution of each soluble salt could be added to the composite.

When impregnation is employed to introduce the hydrogenation metals into the composite, the support material may be pelleted, extruded, or made into the desired shape and size either prior to or following the impregnation.

The catalytic composition of the present invention may be employed in several embodiments of the process of the present invention for the hydroprocessing of hydrocarbon materials. According to the invention, there is provided a process for the hydroprocessing of a hydrocarbon feedstock, which process comprises contacting in a reaction zone said feedstock with the catalytic composition of the present invention in the presence of hydrogen and under hydroprocessing conditions. Suitable hydrocarbon feedstocks may comprise hydrocarbon distillates, such as naphthas and light gas oils. On the other hand, the hydrocarbon feedstocks may comprise heavier stocks, such as heavy gas oils and petroleum hydrocarbon residua. Other suitable hydrocarbon materials are shale oil, liquified coal, and oil from tar sands.

Petroleum crudes are composed of a large variety of hydrocarbons, which include heavy distillates and hydrocarbon residua. Heavy distillates boil at temperatures above about 570°F. and include the heavy gas oils and light lubricating oils. The hydrocarbon residua, which are made up of saturates, monaromatics, polyaromatics, resins and asphalt, are found to have molecular weights ranging from about 600 to about 1,200, or above. Such hydrocarbon materials can be treated successfully by the process of the present invention.

Hydrocarbon residua are, for the most part, by-products of processes which are primarily used to obtain other petroleum products. The residual fuel oils are examples of such hydrocarbon residua. Commercial residual fuel oils have gravities which may vary between 8.9° and 23.5° API, flash points within the range of about 150°F. and about 450°F., and pour points within the range of about −55°F. to about 50°F. Their Conradson carbon residues may fall within a range of about 0.1 percent to about 11.5 percent and their boiling points may fall within a range of about 300°F. to about 1,100°F.

The heavier fractions of the various petroleum crudes will contain appreciable amounts of sulfur and nitrogen, as well as certain so-called heavy metals, such as vanadium and nickel. For example, a vacuum reduced crude may be found to contain as much as 100 ppm nickel. Metals such as these deleteriously affect the life of any catalyst over which the hydrocarbons containing such metals are being processed. It is submitted that the catalytic composition of the present invention can treat feedstocks containing such heavy metals for extended periods of time with little deleterious effect on the performance of the catalytic composition.

An embodiment of the process of the present invention is a process for the hydrodesulfurization of a hydrocarbon feedstock. During such hydrodesulfurization process, a substantial proportion of the sulfur in the feedstock is removed therefrom. Typically, the hydrodesulfurization conditions that are employed in the hydrodesulfurization process of the present invention comprise a temperature of about 500°F. to about 850°F., a hydrogen partial pressure of about 100 psig to about 2,000 psig, a hydrogen-to-hydrocarbon ratio of about 200 standard cubic feet of hydrogen per barrel of hydrocarbon (SCFB) to about 15,000 SCFB, a liquid hourly space velocity (LHSV) of about 0.2 to about 10.0 volumes of hydrocarbon per hour per volume of catalyst. Preferably, the hydrodesulfurization process of the present invention employs operating conditions which comprise a temperature of about 550°F. to about 800°F., a hydrogen partial pressure of about 250 psig to about 1,500 psig, a hydrogen-to-hydrocarbon ratio of about 1,000 SCFB to about 10,000 SCFB, and a LHSV of about 0.3 to about 5.0 volumes of hydrocarbon per hour per volume of catalyst.

If the embodiment of the process of the present invention is a process for the hydrodesulfurization of a hydrocarbon feedstock selected from the group consisting of petroleum hydrocarbon residua, shale oil, liquified coal, oil from tar sands, and combinations thereof, the operating conditions comprise a temperature of about 600°F. to about 850°F., a hydrogen partial pressure of about 1,000 psig to about 2,000 psig, a hydrogen-to-hydrocarbon ratio of about 1,000 SCFB to about 15,000 SCFB, and a LHSV about 0.2 to about 3.0 volumes of hydrocarbon per hour per volume of catalyst.

Preferred embodiments of the catalytic composition and the process of the present invention are presented in the following examples. These examples are presented for the purpose of illustration only and are not intended to limit the scope of the present invention.

EXAMPLE I

In this example, a catalytic composition comprising cobalt and molybdenum and their oxides on a solid catalytic support comprising a composite of zinc oxide and a catalytically active alumina was prepared.

An alumina sol that would provide an HF-type alumina was obtained from the Nalco Chemical Co. and was employed as the source of the alumina.

A 1,000-gram portion of the Nalco alumina sol, containing about 10 weight percent solids, was slurried with 2 liters of distilled water. A solution containing 40 grams of zinc nitrate, $Zn(NO_3)_2 \cdot 6H_2O$, dissolved in 200 ml of distilled water was added to the slurry. The material was thoroughly mixed, and the pH of the resulting mixture was raised to 9.0 by the addition of a dilute ammonium hydroxide solution. The mixture was then heated to 90°C. (194°F.) and filtered. The filter cake was reslurried with 2 liters of distilled water and the resultant slurry was again filtered. The filter cake was then slurried with methyl alcohol and the slurry was permitted to stand overnight. In the morning, the material was again filtered, and the filter cake was slurried with 2 liters of methyl alcohol and permitted to stand overnight. Then the slurry was filtered and the filter cake was dried under a heat lamp in static air. The dried material was calcined for 2 hours in static air at a temperature of 1,000°F.

The calcined material was then ground to 14–20-mesh material (U.S. Sieve Series). A 41-gram portion of this ground material was impregnated with 50 ml of a solution that contained 7.5 grams of molybdenum trioxide dissolved in a dilute ammonium hydroxide solution. Water was removed from the composition by evaporation and the material was calcined for 2 hours at a temperature of 900°F. in static air. The material was then impregnated with 50 ml of a solution that contained 5.0 grams of cobalt acetate, $Co(C_2H_3O_2)_2 \cdot 4H_2O$. Water was removed from the composition by evaporation and the material was calcined for 4 hours in static air at 900°F.

This catalyst, hereinafter identified as Catalyst A, was prepared to contain 3 weight percent oxide and 15 weight percent molybdenum trioxide, based on the weight of the catalytic composition. The catalyst support was prepared to contain 10 weight percent zinc oxide and 90 weight percent alumina.

Catalyst A possessed a surface area of 232 square meters per gram, a pore volume of 0.45 cubic centimeters per gram, and an average pore diameter of 79 A. It was found to have a pore size distribution range varying from about 34 A to about 400 A.

EXAMPLE II

In this example, an embodiment of the catalytic composition of the present invention was prepared. An alumina sol containing about 10 weight percent alumina was obtained from the American Cyanamid Company. A 900-gram portion of this alumina sol was diluted with 2.5 liters of distilled water and mixed with a solution prepared by dissolving 45 grams of zinc nitrate in 100 ml of distilled water. To this composite was added 18 grams of ethyl ortho silicate. After the composite was thoroughly mixed, the pH thereof was raised to 9.0 by the addition of dilute ammonium hydroxide solution. The mixture was then heated to a temperature of 60°C. (140°F.). The mixture was then dried under a heat lamp in static air and subsequently was calcined for 2 hours in static air at a temperature of 1,000°F.

The calcined material was then pulverized into 14–20-mesh particles and a 68-gram portion of said finely-divided material was impregnated with 100 ml of a solution that contained 13 grams of molybdenum trioxide. Water was removed from the solid material by evaporation, and the dried material was then calcined for 1 hour at a temperature of 1,000°F. The calcined material was impregnated subsequently with 100 ml of a solution that contained 8.5 grams of cobalt acetate, $Co(C_2H_3O_2)_2 \cdot 4H_2O$. Water was evaporated from the catalyst and the material was calcined subsequently in static air for 4 hours at a temperature of 1,000°F.

The catalyst, hereinafter identified as Catalyst B, was prepared to contain 3 weight percent cobalt oxide and 15.6 weight percent molybdenum trioxide, based on the weight of the catalytic composition. The catalyst support was prepared to contain 5 weight percent silica and 10 weight percent zinc oxide.

Catalyst B possessed a surface area of 330 square meters per gram, a pore volume of 0.62 cubic centimeters per gram, and an average pore diameter of 80 A. It was found to have a tri-modal pore size distribution, falling substantially within pore diameters of about 30 A to about 400 A.

EXAMPLE III

In this example, a typical hydroprocessing catalyst obtained from the Nalco Chemical Company was employed. This catalyst, hereinafter identified as Catalyst C, contained 3 weight percent cobalt oxide and 15 weight percent molybdenum trioxide on a catalytically active alumina.

Catalyst C possessed a surface area of 336 square meters per gram, a pore volume of 0.63 cubic centimeters per gram, and an average pore diameter of 80 A. This catalyst provided a tri-modal, relatively broad pore size distribution, the pore diameters ranging from about 30 A to about 600 A.

EXAMPLE IV

Each of the catalysts that are discussed in Examples I through III was tested for its ability to hydrodesulfurize a Khafji high-sulfur atmospheric resid. This petroleum hydrocarbon feedstock contained 10.9 weight percent hydrogen, 83.5 weight percent carbon, 5.6 weight percent material boiling below 650°F., and 46.5 weight percent material boiling below 1,000°F. Its API gravity was approximately 14.8° and its pour point was 50°F. The feedstock contained 4.4 weight percent sulfur and approximately 0.3 weight percent nitrogen, and it possessed a viscosity of 261 centistokes at 150°F. and a viscosity of 54.7 centistokes at 210°F. Moreover, it contained 44.7 weight percent oils, 37.1 weight percent resins, and 14.5 weight percent asphaltenes.

Each of these tests was conducted in a bench-scale test unit having automatic controls for pressure, flow of reactants, and temperature. In each case, the reactor was made from ⅜-inch inside diameter stainless steel heavy-wall tubing. A ⅛-inch outside diameter thermowell extended up through the center of the reactor. The reactor was heated by an electrically heated steel block. Hydrocarbon feed was fed to the unit by means of a Ruska pump, a positive displacement pump. For each test, 16.2 cubic centimeters of catalyst were employed. The catalyst was present in the form of 14–20-mesh material (U.S. Sieve Series) and was supported on 10–14-mesh alundum particles. A 1-inch layer of 10–14-mesh alundum particles was placed over the catalyst bed in the reactor. The catalyst was placed in the annular space between the thermowell and the internal wall of the ⅜-inch reactor. The reactor was 30 inches in length and the catalyst bed had a height of about 12 inches. Hydrocarbon feed and hydrogen were introduced into the top of the reactor and the mixture that was formed flowed downwardly through the reactor. In each case, effluent from the reactor was collected in a liquid product receiver, while the gas from the reactor was passed through a product receiver to a pressure control valve and subsequently through a wet test meter to an appropriate vent.

For each of the three tests, the test unit was operated at a hydrogen pressure of 1,650 psig, an LHSV of 0.37 volume of hydrocarbon per hour per volume of catalyst, and a hydrogen-to-hydrocarbon ratio of about 10,000 SCFB. The data obtained from each run were corrected to the temperature that was necessary to provide 89 weight percent desulfurization of the feedstock employed. This provided a 0.5 weight percent sulfur content in the total liquid product. The corrected data are presented in the accompanying FIGURE.

The desulfurization activity of a catalyst may be expressed in terms of the temperature that is required to provide a certain amount of desulfurization. A catalyst is more active than another catalyst when the temperature that it needs is lower than the temperature that is required for the other catalyst to provide comparable desulfurization. For example, a catalyst with twice the activity of a second one will give the same desulfurization when operating at a 40°F. lower temperature, or it will give the same desulfurization at the same temperature when operating at twice the liquid hourly space velocity. As the catalyst is deactivated by deposition of metals or coke, it is necessary to raise the temperature to compensate for this decline in catalyst activity. However, when the temperature is raised to 800°–850°F., cracking reactions and coke formation become excessive. Then the process cycle must be terminated and the catalyst regenerated or replaced.

It can be seen from the accompanying FIGURE that Catalyst B, the embodiment of the catalytic composition of the present invention, is much more active than the typical hydroprocessing catalyst, Catalyst C. Catalyst B has an initial activity that is close to the initial activity of Catalyst A, but has an activity maintenance that is superior to that furnished by Catalyst A, the catalyst comprising a support of zinc oxide and alumina.

The test employing Catalyst B, the embodiment of the catalytic composition of the present invention, comprises an embodiment of the process of the present invention.

During the 50 days of the test employing Catalyst B, the 14.5 weight percent asphaltenes of the feed was reduced to about 4 weight percent while the 37.1 weight percent resins of the feed was reduced to a value of about 22 to about 23 weight percent. Therefore, the resin-to-asphaltene ratio (about 5:1) of the product was maintained at a higher level than the resin-to-asphaltene ratio (about 2.6) of the feedstock employed in the test. It is apparent that the use of this catalyst minimized the conversion of resins to oils relative to the conversion of asphaltenes, thus preventing the asphaltenes from creating a condition that allows them to separate from the liquid to plug the unit and to give unstable products.

What is claimed is:

1. A process for the hydrodesulfurization of a hydrocarbon feedstock, which process comprises contacting in a reaction zone said feedstock with a catalytic composition in the presence of hydrogen and under hydrodesulfurization conditions, which catalytic composition comprises a hydrogenation component comprising a metal of Group VIA of the Periodic Table of Elements and a metal of Group VIII of the Periodic Table on a solid catalytic support comprising a composite of zinc oxide, silica, and a catalytically active alumina, each metal of said hydrogenation component being present in the elemental form, as the oxide, as the sulfide, or as a combination thereof.

2. The process of claim 1 wherein said catalytic support of said catalytic composition has been prepared by: (1) adding an aqueous solution of a soluble zinc salt and a member selected from the group consisting of a suspension of an organic silicate in water and an aqueous alkali silicate solution to an alumina sol; (2) thoroughly blending said aqueous solution of a soluble zinc salt, said member selected from the group consisting of a suspension of an organic silicate in water and an aqueous alkali silicate solution, and the alumina sol to obtain a thoroughly blended mixture; (3) gelling said thoroughly blended mixture by adding a member selected from the group consisting of an aqueous solution of an alkali metal hydroxide and a solution of ammonium hydroxide to said thoroughly blended mixture to provide a pH of about 5.5 to about 10.0 and to obtain a gel; (4) filtering said gel to obtain a filtered material; (5) washing said filtered material with a member selected from the group consisting of water and ammonium carbonate solution to remove non-volatile soluble ions from the filtered material and to obtain a washed filtered material; (6) drying said washed filtered material to obtain a dried material; and (7) calcining said dried material in air at a temperature of at least 600°F. for a period of time of at least 0.5 hour.

3. The process of claim 2 wherein said feedstock is a member selected from the group consisting of petroleum hydrocarbon residua, shale oil, liquified coal, oil from tar sands, and combinations thereof.

4. The process of claim 3 wherein said hydrodesulfurization conditions comprise a temperature of about 600°F. to about 850°F., a hydrogen partial pressure of about 600 psig to about 2,000 psig, a hydrogen-to-hydrocarbon ratio of about 1,000 SCFB to about 15,000 SCFB, and a LHSV of about 0.2 to about 3.0 volumes of hydrocarbon per hour per volume of catalyst.

5. The process of claim 2 wherein said metal of Group VIA is molybdenum and said metal of Group VIII is cobalt, said molybdenum being present in an amount of about 2 weight percent to about 20 weight percent, calculated as MoO$_3$, and based on the weight of said catalytic composition, and said cobalt being present in an amount of about 0.5 weight percent to about 5 weight percent, calculated as CoO and based on the weight of said catalytic composition, said silica is present in an amount of about 2 weight percent to about 10 weight percent, based on the weight of said catalytic support, and said catalytic support comprises a maximum amount of about 50 weight percent zinc oxide, based on the weight of said catalytic support.

6. The process of claim 5 wherein said feedstock is a member selected from the group consisting of petroleum hydrocarbon residua, shale oil, liquified coal, oil from tar sands, and combinations thereof.

7. The process of claim 6 wherein said hydrodesulfurization conditions comprise a temperature of about 600°F. to about 850°F., a hydrogen partial pressure of about 600 psig to about 2,000 psig, a hydrogen-to-hydrocarbon ratio of about 1,000 SCFB to about 15,000 SCFB, and a LHSV of about 0.2 to about 3.0 volumes of hydrocarbon per hour per volume of catalyst.

8. The process of claim 5 wherein said hydrodesulfurization conditions comprise a temperature of about 500°F. to about 850°F., a hydrogen partial pressure of about 100 psig to about 2,000 psig, a hydrogen-to-hydrocarbon ratio of about 200 SCFB to about 15,000 SCFB, and a LHSV of about 0.2 to about 10.0 volumes of hydrocarbon per hour per volume of catalyst.

9. The process of claim 2 wherein said hydrodesulfurization conditions comprise a temperature of about 500°F. to about 850°F., a hydrogen partial pressure of about 100 psig to about 2,000 psig, a hydrogen-to-hydrocarbon ratio of about 200 SCFB to about 15,000 SCFB, and a LHSV of about 0.2 to about 10.0 volumes of hydrocarbon per hour per volume of catalyst.

10. The process of claim 1 wherein said feedstock is a member selected from the group consisting of petroleum hydrocarbon residua, shale oil, liquified coal, oil from tar sands, and combinations thereof.

11. The process of claim 10 wherein said hydrodesulfurization conditions comprise a temperature of about 600°F. to about 850°F., a hydrogen partial pressure of about 600 psig to about 2,000 psig, a hydrogen-to-hydrocarbon ratio of about 1,000 SCFB to about 15,000 SCFB, and a LHSV of about 0.2 to about 3.0 volumes of hydrocarbon per hour per volume of catalyst.

12. The process of claim 1 wherein said metal of Group VIA is molybdenum and said metal of Group VIII is cobalt, said molybdenum being present in an amount of about 2 weight percent to about 20 weight percent, calculated as MoO$_3$ and based on the weight of said catalytic composition, and said cobalt being present in an amount of about 0.5 weight percent to about 5 weight percent, calculated as CoO and based on the weight of said catalytic composition, said silica is present in an amount of about 2 weight percent to about 10 weight percent, based on the weight of said catalytic support, and said catalytic support comprises a maximum amount of about 50 weight percent zinc oxide, based on the weight of said catalytic support.

13. The process of claim 12 wherein said feedstock is a member selected from the group consisting of petroleum hydrocarbon residua, shale oil, liquified coal, oil from tar sands, and combinations thereof.

14. The process of claim 13 wherein said hydrodesulfurization conditions comprise a temperature of about 600°F. to about 850°F., a hydrogen partial pressure of about 600 psig to about 2,000 psig, a hydrogen-to-hydrocarbon ratio of about 1,000 SCFB to about 15,000 SCFB, and a LHSV of about 0.2 to about 3.0 volumes of hydrocarbon per hour per volume of catalyst.

15. The process of claim 12 wherein said hydrodesulfurization conditions comprise a temperature of about 500°F. to about 850°F., a hydrogen partial pressure of about 100 psig to about 2,000 psig, a hydrogen-to-hydrocarbon ratio of about 200 SCFB to about 15,000 SCFB, and a LHSV of about 0.2 to about 10.0 volumes of hydrocarbon per hour per volume of catalyst.

16. The process of claim 1 wherein said hydrodesulfurization conditions comprise a temperature of about 500°F. to about 850°F., a hydrogen partial pressure of about 100 psig to about 2,000 psig, a hydrogen-to-hydrocarbon ratio of about 200 SCFB to about 15,000 SCFB, and a LHSV of about 0.2 to about 10.0 volumes of hydrocarbon per hour per volume of catalyst.

* * * * *